(12) United States Patent
Fujii et al.

(10) Patent No.: US 9,079,518 B2
(45) Date of Patent: Jul. 14, 2015

(54) SEAT APPARATUS FOR VEHICLE

(71) Applicant: Aisin Seiki Kabushiki Kaisha, Kariya (JP)

(72) Inventors: Yuki Fujii, Chiryu (JP); Hiroki Kino, Chita-gun (JP); Toshiro Maeda, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 171 days.

(21) Appl. No.: 13/803,625

(22) Filed: Mar. 14, 2013

(65) Prior Publication Data
US 2013/0253779 A1 Sep. 26, 2013

(30) Foreign Application Priority Data

Mar. 22, 2012 (JP) ................................ 2012-065518

(51) Int. Cl.
 - *B60N 2/00* (2006.01)
 - *B60N 2/44* (2006.01)
 - *B60N 2/02* (2006.01)

(52) U.S. Cl.
CPC .............. *B60N 2/443* (2013.01); *B60N 2/0248* (2013.01); *B60N 2/0252* (2013.01); *B60N 2/442* (2013.01)

(58) Field of Classification Search
None
See application file for complete search history.

(56) References Cited

U.S. PATENT DOCUMENTS

| 4,807,715 | A | 2/1989 | Nagashima et al. |
| 7,301,441 | B2 * | 11/2007 | Inada et al. ............... 340/426.13 |
| 2009/0248257 | A1 * | 10/2009 | Hoshino et al. .................. 701/49 |
| 2012/0007401 | A1 * | 1/2012 | Hashimoto ............. 297/344.13 |

FOREIGN PATENT DOCUMENTS

| CN | 1856416 A | 11/2006 |
| CN | 102328605 A | 1/2012 |
| FR | 2 696 384 A1 | 4/1994 |
| JP | 58-76336 A | 5/1983 |
| JP | 9-202164 A | 8/1997 |
| JP | 2009-241774 | 10/2009 |

OTHER PUBLICATIONS

Extended European Search Report issued Jul. 29, 2013, in European Patent Application No. 13160436.5.
Combined Office Action and Search Report issued Feb. 3, 2015 in Chinese Patent Application No. 201310094813.7 (with English language translation).

* cited by examiner

*Primary Examiner* — John R Olszewski
*Assistant Examiner* — James M McPherson
(74) *Attorney, Agent, or Firm* — Oblon, McClelland, Maier & Neustadt, L.L.P.

(57) ABSTRACT

A seat apparatus for a vehicle includes a seating surface adjustment mechanism provided with an actuator and moving a seating surface of a vehicle seat in an up-down direction, a seat position adjustment mechanism for moving the vehicle seat in a vehicle front-rear direction, a seat position detection portion for detecting a front-rear direction position of the vehicle seat, a vehicle egress intention detection portion for detecting an intention of an occupant of the vehicle to get off the vehicle, and a drive control portion for performing a vehicle egress seating surface control in a case where the vehicle egress intention detection portion detects the intention of the occupant to get off the vehicle, the vehicle egress seating surface control controlling the seating surface adjustment mechanism so that the seating surface is positioned at a seating surface position set to correspond to the front-rear direction position of the seat.

4 Claims, 4 Drawing Sheets

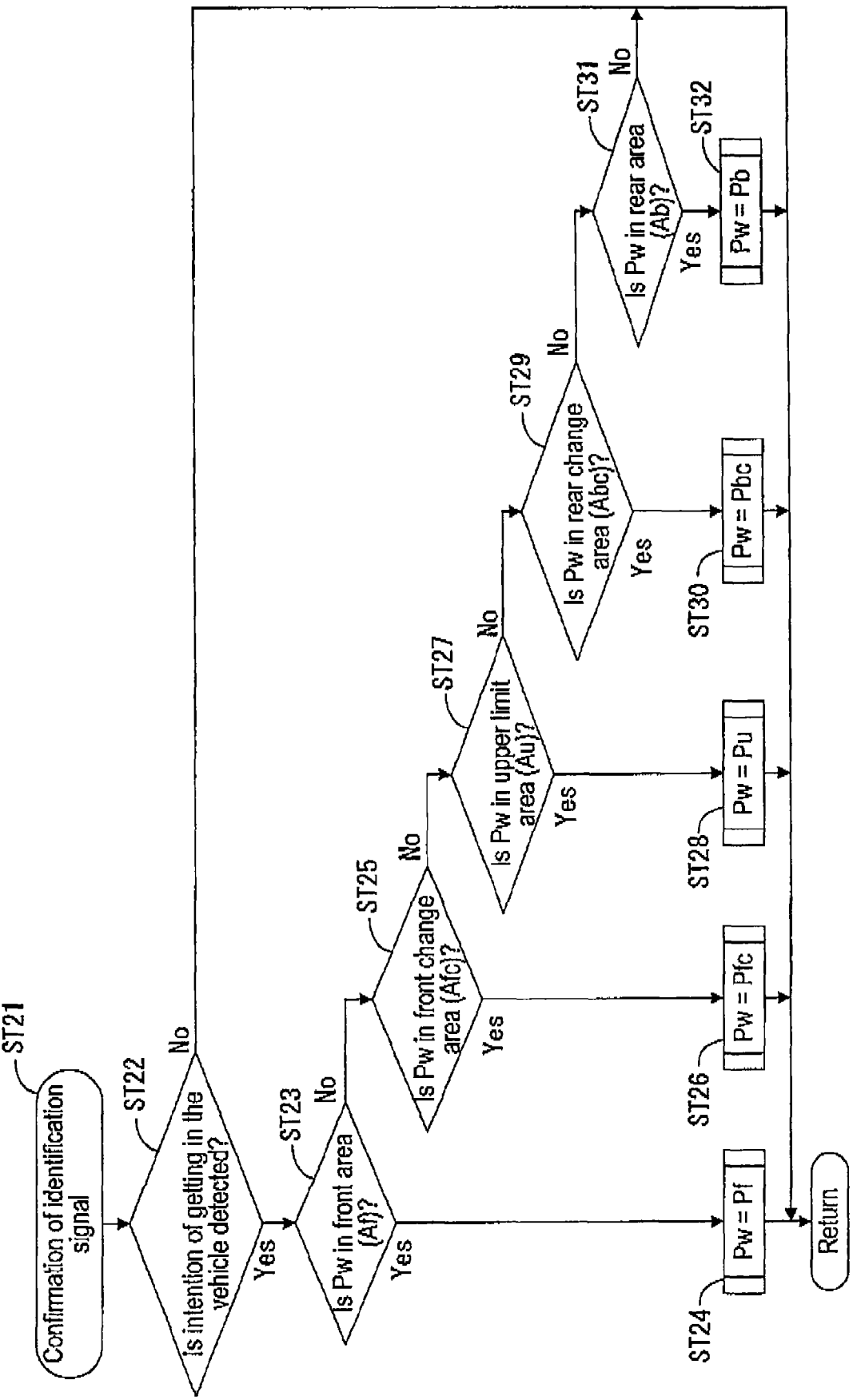

SEAT APPARATUS FOR VEHICLE

CROSS REFERENCE TO RELATED APPLICATIONS

This application is based on and claims priority under 35 U.S.C. §119 to Japanese Patent Application 2012-065518, filed on Mar. 22, 2012, the entire content of which is incorporated herein by reference.

TECHNICAL FIELD

This disclosure generally relates to a seat apparatus for a vehicle.

BACKGROUND DISCUSSION

A known seat apparatus for a vehicle is disclosed in JP2009-241774A (which is hereinafter referred to as Patent reference 1). The known vehicle seat apparatus disclosed in Patent reference 1 includes a control portion which determines a build of an occupant seated on a vehicle seat by means of a camera apparatus mounted on a door mirror of the vehicle and moves a seating surface of the vehicle seat to a position that is suitable for the occupant to get off the vehicle on the basis of the build of the occupant detected from an image data taken by the camera apparatus in a case where a movement of the occupant to get off the vehicle is predicted. As the control portion performs a drive control of the seating surface of the seat, a stressed feeling that the occupant may have during getting off the vehicle is reduced and ease of the occupant's egress from the vehicle is enhanced.

According to the known vehicle seat apparatus disclosed in Patent reference 1, however, the control portion determines the build of the occupant on the basis of the image data taken by the camera apparatus. Accordingly, the control portion needs to perform complicated processing in order to determine the build of the occupant from the image data, and therefore a high-performance control portion is required. In addition, the camera apparatus needs to be separately provided at the door mirror for build determination of the occupant, which may increase overall costs of the seat apparatus.

A need thus exists for a seat apparatus for a vehicle, which is not susceptible to the drawback mentioned above.

SUMMARY

According to an aspect of this disclosure, a seat apparatus for a vehicle includes a seating surface adjustment mechanism provided with an actuator and moving a seating surface of a vehicle seat in an up-down direction by means of an actuation of the actuator, a seat position adjustment mechanism for moving the vehicle seat in a vehicle front-rear direction, a seat position detection portion for detecting a front-rear direction position of the vehicle seat, a vehicle egress intention detection portion for detecting an intention of an occupant of the vehicle to get off the vehicle, and a drive control portion for performing a vehicle egress seating surface control in a case where the vehicle egress intention detection portion detects the intention of the occupant to get off the vehicle, the vehicle egress seating surface control controlling the seating surface adjustment mechanism so that the seating surface of the vehicle seat is positioned at a seating surface position that is set to correspond to the front-rear direction position of the vehicle seat which is detected at the seat position detection portion.

BRIEF DESCRIPTION OF THE DRAWINGS

The foregoing and additional features and characteristics of this disclosure will become more apparent from the following detailed description considered with the reference to the accompanying drawings, wherein:

FIG. 4 is a flowchart illustrating a vehicle ingress seating surface control according to the embodiment.

DETAILED DESCRIPTION

An embodiment of this disclosure will be explained in detail with reference to FIGS. 1 to 4. In this embodiment, a front-rear direction and an up-down direction refer to a vehicle front-rear direction and a vehicle up-down direction, respectively. In this embodiment, getting in the vehicle and getting off the vehicle include same meanings as ingress and egress relative to the vehicle, respectively.

Figure 1:
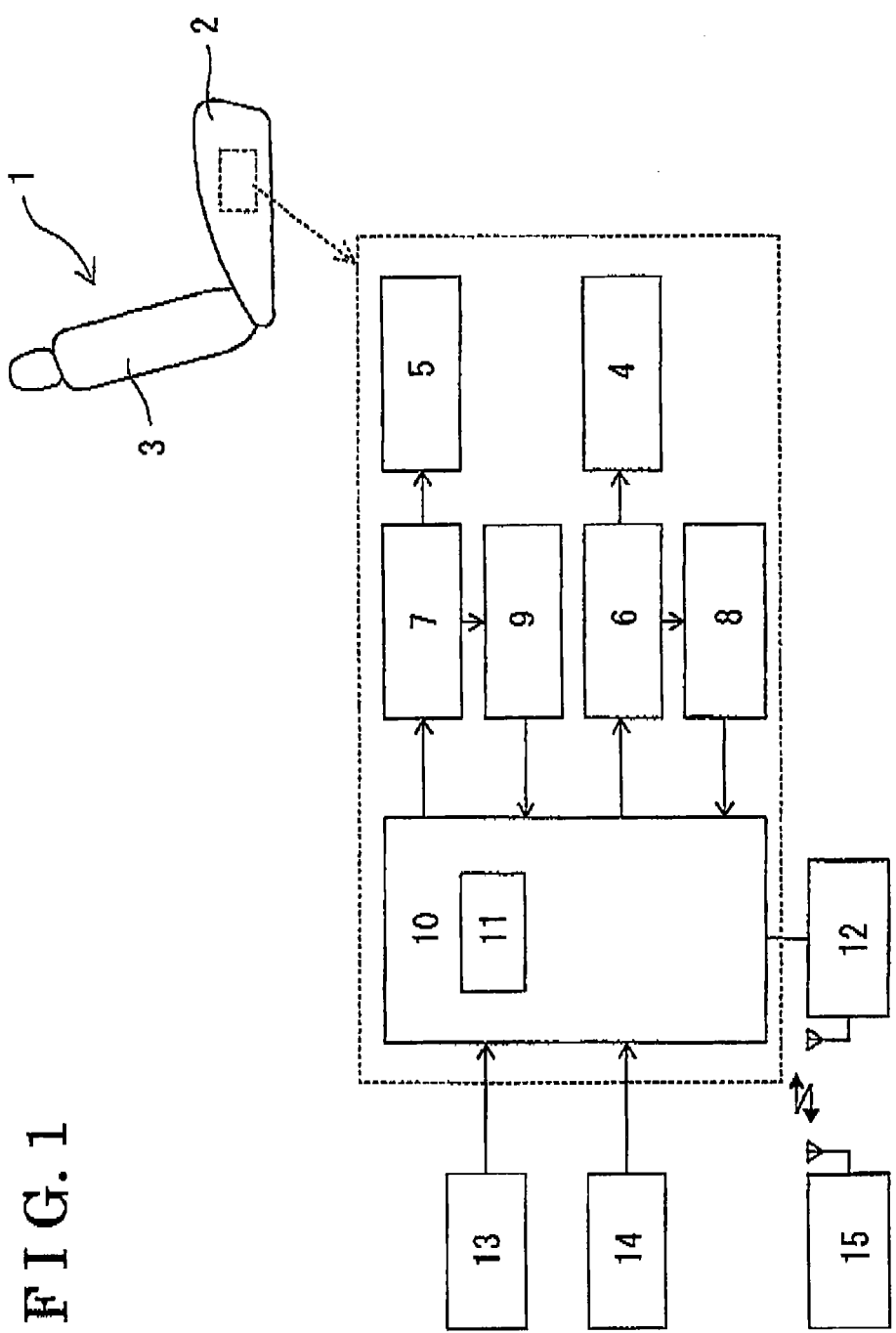
FIG. 1 is a block diagram illustrating an electrical configuration of a seat apparatus for a vehicle according to an embodiment disclosed here.

As illustrated in FIG. 1, a seat 1 (i.e., a vehicle seat) mounted on an interior floor of a vehicle, is provided with a seat cushion 2 forming a seating surface, and a seat back 3 forming a back rest and supported at a rear end portion of the seat cushion 2 so as to be tiltable in the front-rear direction.

The seat 1 is provided with a mechanism for adjusting a state (position) of the seat 1. That is, the seat 1 is provided with a seating surface adjustment mechanism 4 for adjusting a position of the seat cushion 2 of the seat 1 in the up-down direction by moving the seat cushion 2 freely and a seat position adjustment mechanism 5 for adjusting a position of the seat 1 in the front-rear direction by moving the seat 1 freely. The seat 1 may be provided with, for example, a reclining mechanism for tilting the seat back 3 relative to the seat cushion 2 and/or a cushion length mechanism for adjusting the position of the seat cushion 2 in the front-rear direction relative to the seat back 3 in addition to the above-described mechanisms.

The seating surface adjustment mechanism 4 is provided with an up-down driving actuator 6 (i.e., an actuator) configured by an electric motor, and has a function of moving the seat cushion 2 in the up-down direction by an actuation of the up-down driving actuator 6. The seat position adjustment mechanism 5 is provided with a front-rear driving actuator 7 configured by an electric motor, and has a function of moving the seat 1 in the front-rear direction by an actuation of the front-rear driving actuator 7.

The seat 1 is provided with a drive control portion 10 for controlling the up-down driving actuator 6 and the front-rear driving actuator 7. The drive control portion 10 performs a calculation process in accordance with a control program that is recorded in advance in, for example, ROM which is configured by an electronic control unit (ECU) provided with CPU, ROM, RAM and so forth.

The front-rear driving actuator 7 is provided with a seat position detection portion 9 for detecting the position of the seat 1 in the front-rear direction. In this embodiment, the seat position detection portion 9 is configured by a Hall IC that detects a number of rotations of the front-rear driving actuator 7 of the seat position adjustment mechanism 5, and the seat position detection portion 9 outputs a position detection signal detected by the seat position detection portion 9 to the drive control portion 10 that is electrically connected to the seat position detection portion 9. However, the seat position detection portion 9 is not limited to the above-described configuration detecting the number of rotations of the actuator, and may include configuration other than the Hall IC as long as the seat position detection portion 9 detects the position of the seat.

The up-down driving actuator 6 is provided with a seating surface position detection portion 8 for detecting the position of the seat 1, that is, the position of the seat cushion 2 of the seat 1, in the up-down direction. In this embodiment, the seating surface position detection portion 8 is configured by a Hall IC that detects a number of rotations of the up-down driving actuator 6 of the seating surface adjustment mechanism 4, and the seating surface position detection portion 8 outputs a position detection signal detected by the seating surface position detection portion 8 to the drive control portion 10 that is electrically connected to the seating surface position detection portion 8. However, the seating surface position detection portion 8 is not limited to the above-described configuration detecting the number of rotations of the actuator, and may include configuration other than the Hall IC as long as the seating surface position detection portion 8 detects the position of the seat. Next, an electrical configuration of the seat apparatus for the vehicle according to this embodiment will be explained.

As illustrated in FIG. 1, the front-rear driving actuator 7 and the seat position detection portion 9 thereof, and the up-down driving actuator 6 and the seating surface position detection portion 8 thereof are electrically connected to the drive control portion 10. Further, each of a vehicle egress intention detection portion 13 and a vehicle ingress intention detection portion 14 is connected to the drive control portion 10 via an on-vehicle LAN including, for example, a CAN (Controller Area network) and a LIN (Local Interconnect network). The drive control portion 10 includes a memory portion 11 which is built in the drive control portion 10 and which is configured by, for example, an EEPROM.

The vehicle egress intention detection portion 13 is configured by a buckle switch for detecting locked/unlocked state of a buckle of a seatbelt and is configured to detect an intention of the occupant to get off the vehicle when the occupant gets off the vehicle. The intention of the occupant to get off the vehicle when the occupant gets off the vehicle includes the intention to get off the vehicle which occurs before the occupant gets off the vehicle. That is, the vehicle egress intention detection portion 13 outputs a vehicle egress intention detection signal detected at the vehicle egress intention detection portion 13 to the drive control portion 10 upon detecting the unlocked state of the buckle of the seatbelt. The vehicle egress intention detection portion 13 is not limited to the above-explained configuration where the intention of the occupant to get off the vehicle is detected by means of the buckle switch, and may be configured by, for example, an ignition switch of an engine and may detect an off state of the ignition switch.

The vehicle ingress intention detection portion 14 is configured by a door courtesy switch and is configured to detect an intention of a user to get in the vehicle when the user gets in the vehicle. The intention of the user to get in the vehicle when the user gets in the vehicle includes the intention to get in the vehicle which occurs before the user gets in the vehicle. That is, the vehicle ingress intention detection portion 14 outputs a vehicle ingress intention detection signal from the vehicle ingress intention detection portion 14 to the drive control portion 10 upon detecting an open state of a vehicle door. The vehicle ingress intention detection portion 14 is not limited to the above-described configuration where the intention of the user to get in the vehicle is detected by means of the door courtesy switch, and may be configured by a receiver that detects the intention to get in the vehicle by receiving an unlock signal from an electric key.

In this embodiment, the seat apparatus for the vehicle identifies the user who is going to get in the vehicle, that is, to get on the seat cushion 2 of the seat 1, via a radio communication between a portable equipment 15 and a user identification portion 12 of the drive control portion 10. The portable equipment 15 is configured by, for example, an electric key and is configured to transmit an identification signal, which indicates the user, to the user identification portion 12 of the drive control portion 10. The user identification portion 12, which is configured by, for example, a receiver for receiving the signal from the portable equipment 15, conducts the radio communication with the portable equipment 15 and outputs the received signal (the identification signal) to the drive control portion 10. The drive control portion 10 receives the identification signal sent by the portable equipment 15, and checks whether a predetermined relation is satisfied, that is, for example, the drive control portion 10 checks whether the received identification signal coincides with or matches the registration code that is stored at the memory portion 11, and thus the drive control portion 10 identifies the user.

Figure 2:
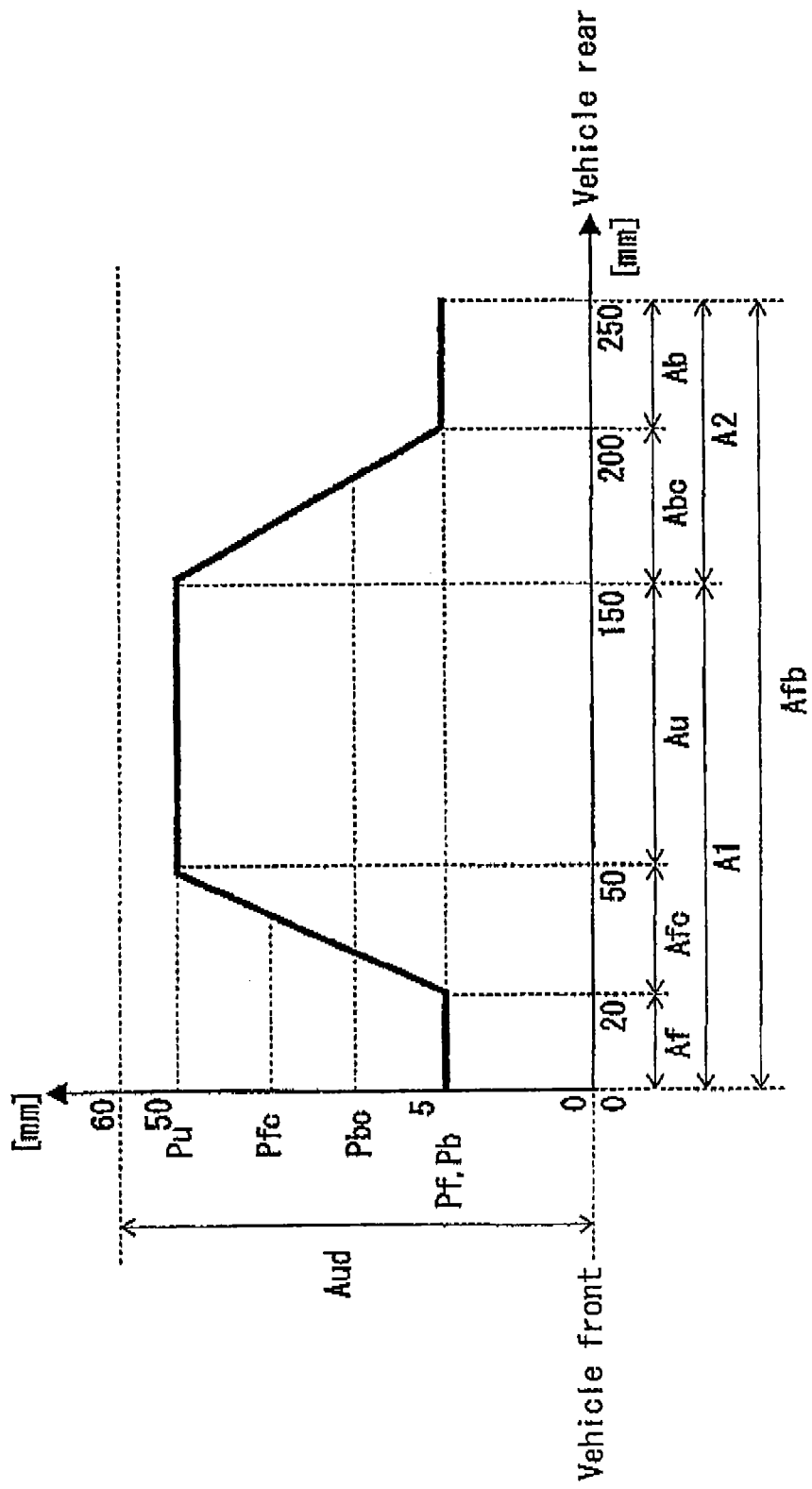
FIG. 2 is a transition diagram illustrating a seating surface position of the seat which corresponds to a position of the seat in a vehicle front-rear direction according to the embodiment.

In response to operation of a seat operation portion configured by, for example, a switch, the drive control portion 10 outputs a control signal to the up-down driving actuator 6 and drive-controls the seating surface adjustment mechanism 4 so that the seat cushion 2 moves in the up-down direction. In a similar manner, in response to the operation of the seat operation portion, the drive control portion 10 outputs a control signal to the front-rear driving actuator 7 and drive-controls the seat position adjustment mechanism 5 so that the seat 1 moves in the front-rear direction. As illustrated in FIG. 2, at the seat position adjustment mechanism 5, a front-rear movable range Afb (for example, 0 mm to 250 mm, a case where the seat is positioned at the most forward end refers to 0 mm, and a case where the seat is positioned at the most rearward end refers to 250 mm), in which the seat 1 is movable in the front-rear direction, is set. The drive control portion 10 is configured to move the seat 1 within the front-rear movable range Afb by drive-controlling the seat position adjustment mechanism 5. At the seating surface adjustment mechanism 4, an up-down movable range Aud (for example, 0 mm to 60 mm, a case where the seat is positioned to be lowest refers to 0 mm and a case where the seat is positioned to be highest refers to 60 mm), in which the seat is movable in the up-down direction, is set. The drive control portion 10 is configured to move the seat cushion 2 within the up-down movable range Aud by drive-controlling the seating surface adjustment mechanism 4.

Further, the drive control portion 10 drive-controls the seating surface adjustment mechanism 4 on the basis of the vehicle egress intention detection signal that is inputted from the vehicle egress intention detection portion 13. More specifically, the drive control portion 10 determines that the occupant has the intention to get off the vehicle in a case where the vehicle egress intention detection signal refers to the signal that indicates the intention of the occupant to get off the vehicle. When the drive control portion 10 detects the above-described vehicle egress intention detection signal, the drive control portion 10 performs a vehicle egress seating surface control on the seating surface adjustment mechanism 4 on the basis of the position detection signal from the seat position detection portion 9. That is, the drive control portion 10 drive-controls the seating surface adjustment mechanism 4 so that the seat cushion 2 is moved to a seating surface position that corresponds to the position of the seat 1 in the front-rear direction when the occupant gets off the vehicle. Here, the seating surface position that corresponds to the position of the seat 1 in the front-rear direction refers to the seating surface position at which the occupant, who is seated in the seat 1 that is positioned at a predetermined position in the front-rear direction, gets off the vehicle with ease. Specifically, the position of the seat 1 in the front-rear direction is likely to be affected by a build of the occupant seated on the seat 1, and it is assumed that the build of the occupant is small in a case where the position of the seat 1 in the front-rear direction is positioned at a front side of the vehicle and it is assumed that the build of the occupant is large in a case where the position of the seat 1 in the front-rear direction is positioned at a rear side of the vehicle. That is, the drive control portion 10 causes the seat cushion 2 to be moved to the seating surface position that is most suitable for the build that is assumed from the position of the seat 1 in the front-rear direction (the seating surface position that facilitates the occupant to get off the vehicle). In this embodiment, the seating surface position most suitable for the build of the occupant, which is assumed from the position of the seat 1 in the front-rear direction which is obtained from the seat position detection portion 9, is set in advance. The drive control portion 10 drive-controls the seating surface adjustment mechanism 4 so that the seat cushion 2 is moved to the above-described most suitable seating surface position that is set in advance.

More specifically, as illustrated in FIG. 2, the drive control portion 10 of this embodiment recognizes a position detection area of the seat 1 by dividing the position detection area into two areas, that is, a first set area A1 (for example, 0 mm to 150 mm) which is set at the front side, that is, forward of the vehicle in the front-rear movable range Afb and a second set area A2 (for example, 150 mm to 250 mm) that is set at the rear side, that is, rearward of the vehicle relative to the first set area A1. Further, at the drive control portion 10, the first set area A1 is subdivided into three areas, that is, to a front area Af (for example, 0 mm to 20 mm) that is positioned at the front side of the vehicle, a front change area Afc (for example, 20 mm to 50 mm) that is set to be rearward relative to the front area Af, and an upper limit area Au (for example, 50 mm to 150 mm) that is set to be rearward relative to the front change area Afc. Further, at the drive control portion 10, the second set area A2 is subdivided into two areas, that is, a rear change area Abc (for example, 150 mm to 200 mm) that is set at the front side of the vehicle and a rear area Ab (for example, 200 mm to 250 mm) that is set rearward relative to the rear change area Abc.

The seating surface position of the seat cushion 2 which corresponds to the position of the seat 1 in the front-rear direction is set by the drive control portion 10 so that a seating surface position Pf (for example, 5 mm) is maintained in the front area Af. A seating surface position Pfc is set so as to rise in proportion to the position of the seat 1 in the front-rear direction in the front change area Afc. A seating surface position Pu (for example, 50 mm) is set so as to maintain the seating surface position Pu in the upper limit area Au. A seating surface position Pbc is set so as to lower in inversely proportional to the position of the seat 1 in the front-rear direction in the rear change area Abc. A seating surface position Pb (for example, 5 mm) is set so as to maintain the seating surface position Pf in the rear area Ab.

In a case where the drive control portion 10 determines that the position of the seat 1 in the front-rear direction is positioned in the front area Af on the basis of the input signal from the seat position detection portion 9, the drive control portion 10 drive-controls the seating surface adjustment mechanism 4 so that the position of the seat cushion 2 of the seat 1 in the up-down direction is moved to the seating position Pf.

In a case where the drive control portion 10 determines that the position of the seat 1 in the front-rear direction is positioned in the front change area Afc on the basis of the input signal from the seat position detection portion 9, the drive control portion 10 drive-controls the seating surface adjustment mechanism 4 so that the position of the seat cushion 2 of the seat 1 in the up-down direction is moved to the seating surface position Pfc.

In a case where the drive control portion 10 determines that the position of the seat 1 in the front-rear direction is positioned in the upper limit area Au on the basis of the input signal from the seat position detection portion 9, the drive control portion 10 drive-controls the seating surface adjustment mechanism 4 so that the position of the seat cushion 2 of the seat 1 in the up-down direction is moved to the seating surface position Pu.

In a case where the drive control portion 10 determines that the position of the seat 1 in the front-rear direction is positioned in the rear change area Abc on the basis of the input signal from the seat position detection portion 9, the drive control portion 10 drive-controls the seating surface adjustment mechanism 4 so that the position of the seat cushion 2 of the seat 1 in the up-down direction is moved to the seating surface position Pbc.

In a case where the drive control portion 10 determines that the position of the seat 1 in the front-rear direction is positioned in the rear area Ab on the basis of the input signal from the seat position detection portion 9, the drive control portion 10 drive-controls the seating surface adjustment mechanism 4 so that the position of the seat cushion 2 of the seat 1 in the up-down direction is moved to the seating surface position Pb.

In this embodiment, the seating surface position Pf is set as a position that is suitable for the build of the occupant which is assumed in a case where the position of the seat 1 in the front-rear direction is positioned in the front area Af. That is, the seating surface position Pf is set at the position where the feet of the occupant, who is assumed to have the small build, touch the ground in a sitting posture on the seat 1 when he or she gets off the vehicle, and the legs and the feet of the occupant are restricted from interfering with and being caught in a vehicle body during a movement of getting off the vehicle. The seating surface position Pu is set as a position that is suitable for the build of the occupant which is assumed in a case where the position of the seat 1 in the front-rear direction is positioned in the upper limit area Au. That is, the seating surface position Pu is set at the position where the feet and the legs of the occupant, who is assumed to have a smaller build than the occupant in the case where the position of the seat 1 in the front-rear direction is in the second set area A2, are restricted from interfering with and being caught in the vehicle and the occupant does not hit his or her head on a ceiling of the vehicle during the movement of getting off the vehicle. The seating surface position Pb is set as a position that is suitable for the build of the occupant which is assumed in a case where the position of the seat 1 in the front-rear direction is positioned in the rear area Ab. That is, the seating surface position Pb is set at the position where the occupant, who is assumed to have a larger build than the occupant in the case where the position of the seat 1 in the front-rear direction is in the upper limit area Au, does not hit his or her head on the ceiling of the vehicle during the movement of getting off the vehicle.

Further, the drive control portion 10 drive-controls the seating surface adjustment mechanism 4 when a user (that is, a vehicle user) gets in the vehicle. Specifically, the drive control portion 10 conducts the radio communication between the portable equipment 15 and the user identification portion 12, and identifies the user who is going to get in the vehicle in a case where the drive control portion 10 determines that the identification signal which is transmitted from the portable equipment 15 carried by the user and which is unique to the user, and the registration code stored at the memory portion 11 satisfy a predetermined correspondence relationship. The drive control portion 10 determines that the occupant, that is, the user, has the intention to get in the vehicle in a case where the vehicle ingress intention detection signal from the vehicle ingress intention detection portion 14 is the signal that indicates the intention of the occupant to get in the vehicle. When the drive control portion 10 detects the above-described vehicle ingress intention detection signal, the drive control portion 10 performs a vehicle ingress seating surface control on the seating surface adjustment mechanism 4 on the basis of the position of the seat 1 in the front-rear direction when the user drives the vehicle, which is stored in the memory portion 11 in advance. That is, the drive control portion 10 drive-controls the seating surface adjustment mechanism 4 so that the seat cushion 2 is moved to the seating surface position that corresponds to the position of the seat 1 in the front-rear direction which is stored in the memory portion 11. The seating surface position of the seat cushion 2 which corresponds to the position of the seat 1 in the front-rear direction is controlled by the drive control portion 10 as illustrated in FIG. 2 in a similar manner to the seating surface control at getting off the vehicle, and therefore the explanations will be omitted.

Next, operation of the seat apparatus of this embodiment, which is performed when the occupant gets off the vehicle, will be explained comprehensively with reference to a flowchart of FIG. 3. Processing explained here is repeated in a predetermined cycle.

Figure 3:
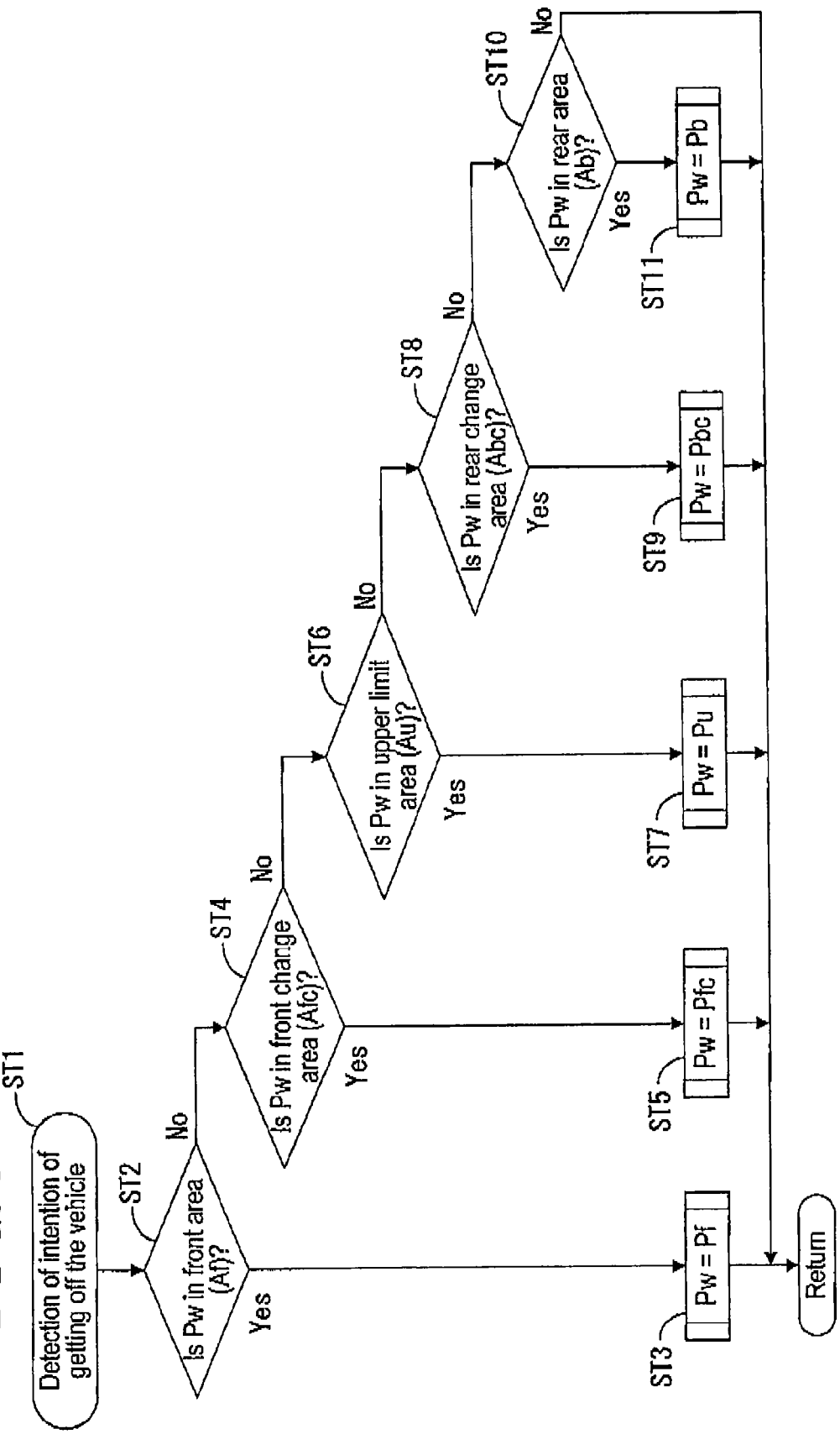
FIG. 3 is a flowchart illustrating a vehicle egress seating surface control according to the embodiment.

In a case where the intention of the occupant to get off the vehicle is detected in a step ST1 on the basis of the vehicle egress intention detection signal that is inputted from the vehicle egress intention detection portion 13, the drive control portion 10 performs the respective processing of steps ST2 to ST11, which follow the step ST1 as illustrated in FIG. 3.

In the step ST2, the drive control portion 10 determines whether or not a front-rear direction position Pw of the seat 1 is in the front area Af on the basis of the position detection signal from the seat position detection portion 9. In a case where the determination result is YES, the flow proceeds to the processing in the step ST3. In the step ST3, the drive control portion 10 controls the seating surface adjustment mechanism 4 so that the seat cushion 2 is moved to the seating surface position Pf. That is, in a case where the position of the seat cushion 2 in the up-down direction is positioned upward relative to the seating surface position Pf, the drive control portion 10 performs the drive-control to move the seat cushion 2 downwardly and to stop the seat cushion 2 at the seating surface position Pf. In a case where the position of the seat cushion 2 in the up-down direction is equal to the seating surface position Pf, the drive control portion 10 once stops, that is, ends the processing here without drive-controlling the seating surface adjustment mechanism 4. On the other hand, in a case where the determination result is NO in the step ST2, the flow proceeds to the processing in the step ST4.

In the step ST4, the drive control portion 10 determines whether or not the front-rear direction position Pw of the seat 1 is in the front change area Afc on the basis of the position detection signal from the seat position detection portion 9. In a case where the determination result is YES, the flow proceeds to the processing in the step ST5. In the step ST5, the drive control portion 10 drive-controls the seating surface adjustment mechanism 4 so that the seat cushion 2 is moved to the seating surface position Pfc. That is, in a case where the position of the seat cushion 2 in the up-down direction is positioned downward relative to the seating surface position Pfc, the drive control portion 10 performs the drive-control to move the seat cushion 2 upwardly and to stop the seat cushion 2 at the seating surface position Pfc. In a case where the position of the seat cushion 2 in the up-down direction is positioned upward relative to the seating surface position Pfc, the drive control portion 10 performs the drive-control to move the seat cushion 2 downwardly and to stop the seat cushion 2 at the seating surface position Pfc. In a case where the position of the seat cushion 2 in the up-down direction is equal to the seating surface position Pfc, the drive control portion 10 once stops the processing here without drive-controlling the seating surface adjustment mechanism 4. On the other hand, in a case where the determination result is NO in the step ST4, the flow proceeds to the processing in the step ST6.

In the step ST6, the drive control portion 10 determines whether or not the front-rear direction position Pw of the seat 1 is in the upper limit area Au on the basis of the position detection signal from the seat position detection portion 9. In a case where the determination result is YES, the flow proceeds to the processing in the step ST7. In the step ST7, the drive control portion 10 drive-controls the seating surface adjustment mechanism 4 so that the seat cushion 2 is moved to the seating surface position Pu. That is, in a case where the position of the seat cushion 2 in the up-down direction is positioned downward relative to the seating surface position Pu, the drive control portion 10 performs the drive-control to move the seat cushion 2 upwardly and to stop the seat cushion 2 at the seating surface position Pu. In a case where the position of the seat cushion 2 in the up-down direction is equal to the seating surface position Pu, the drive control portion 10 once stops the processing here without drive-controlling the seating surface adjustment mechanism 4. On the other hand, in a case where the determination result is NO in the step ST6, the flow proceeds to the processing in the step ST8.

In the step ST8, the drive control portion 10 determines whether or not the front-rear direction position Pw of the seat 1 is in the rear change area Abc on the basis of the position detection signal from the seat position detection portion 9. In a case where the determination result is YES, the flow proceeds to the processing in the step ST9. In the step ST9, the drive control portion 10 controls the seating surface adjustment mechanism 4 so that the seat cushion 2 is moved to the seating surface position Pbc. That is, in a case where the position of the seat cushion 2 in the up-down direction is positioned downward relative to the seating surface position Pbc, the drive control portion 10 performs the drive-control to move the seat cushion 2 upwardly and to stop the seat cushion 2 at the seating surface position Pbc. In a case where the position of the seat cushion 2 in the up-down direction is positioned upward relative to the seating surface position Pbc, the drive control portion 10 performs the drive-control to move the seat cushion 2 downwardly and to stop the seat cushion 2 at the seating surface position Pbc. In a case where the position of the seat cushion 2 in the up-down direction is equal to the seating surface position Pbc, the drive control portion 10 once stops the processing here without drive-controlling the seating surface adjustment mechanism 4. On the other hand, in a case where the determination result is NO in the step ST8, the flow proceeds to the processing in the step ST10.

In the step ST10, the drive control portion 10 determines whether or not the front-rear direction position Pw of the seat 1 is in the rear area Ab on the basis of the position detection signal from the seat position detection portion 9. In a case where the determination result is YES, the flow proceeds to the processing in the step ST11. In the step ST11, the drive control portion 10 drive-controls the seating surface adjustment mechanism 4 so that the seat cushion 2 is moved to the seating surface position Pb. That is, in a case where the position of the seat cushion 2 in the up-down direction is positioned upward relative to the seating surface position Pb, the drive control portion 10 performs the drive-control to move the seat cushion 2 downwardly and to stop the seat cushion 2 at the seating surface position Pb. In a case where the position of the seat cushion 2 in the up-down direction is equal to the seating surface position Pb, the drive control portion 10 once stops the processing here without drive-controlling the seating surface adjustment mechanism 4. On the other hand, in a case where the determination result is NO in the step ST10, the drive control portion 10 once stops the processing here.

Next, operation of the seat apparatus of this embodiment, which is performed when the use gets in the vehicle, will be explained comprehensively with reference to a flowchart of FIG. 4. Processing explained here is repeated in a predetermined cycle. In a step ST21, the drive control portion 10 confirms reception, at the user identification portion 12, of the identification signal from the portable equipment 15. In a case where the drive control portion 10 receives the identification signal and identifies the user in the step ST21, the flow proceeds to a step ST22. In the step ST22, the drive control portion 10 determines whether or not the intention of the user to get in the vehicle is detected on the basis of the vehicle ingress intention detection signal inputted from the vehicle ingress intention detection portion 14. The flow proceeds to the processing in a step ST23 in a case where the determination result is YES, and the drive control portion 10 once stops the processing here in a case where the determination result is NO.

In the step ST23, the drive control portion 10 determines whether or not the front-rear direction position Pw of the seat 1 is in the front area Af on the basis of the front-rear direction position Pw of the seat 1 when the user drives, which is stored in the memory portion 11. In a case where the determination result is YES, the flow proceeds to the processing in a step ST24. In the step ST24, the drive control portion 10 drive-controls the seating surface adjustment mechanism 4 so that the seat cushion 2 is moved to the seating surface position Pf. That is, in a case where the position of the seat cushion 2 in the up-down direction is positioned upward relative to the seating surface position Pf, the drive control portion 10 performs the drive-control to move the seat cushion 2 downwardly and to stop the seat cushion 2 at the seating surface position Pf. In a case where the position of the seat cushion 2 in the up-down direction is equal to the seating surface position Pf, the drive control portion 10 once stops the processing here without drive-controlling the seating surface adjustment mechanism 4. On the other hand, in a case where the determination result is NO in the step ST23, the flow proceeds to the processing in a step ST25.

In the step ST25, the drive control portion 10 determines whether or not the front rear direction position Pw of the seat 1 is in the front change area Afc on the basis of the position detection signal from the seat position detection portion 9. In a case where the determination result is YES, the flow proceeds to the processing in a step ST26. In the step ST26, the drive control portion 10 drive-controls the seating surface adjustment mechanism 4 so that the seat cushion 2 is moved to the seating surface position Pfc. That is, in a case where the position of the seat cushion 2 in the up-down direction is positioned downward relative to the seating surface position Pfc, the drive control portion 10 performs the drive-control to move the seat cushion 2 upwardly and to stop the seat cushion 2 at the seating surface position Pfc. In a case where the position of the seat cushion 2 in the up-down direction is positioned upward relative to the seating surface position Pfc, the drive control portion 10 performs the drive-control to move the seat cushion 2 downwardly and to stop the seat cushion 2 at the seating surface position Pfc. In a case where the position of the seat cushion 2 in the up-down direction is equal to the seating surface position Pfc, the drive control portion 10 once stops the processing here without drive-controlling the seating surface adjustment mechanism 4. On the other hand, in a case where the determination result is NO in the step ST25, the flow proceeds to the processing in a step ST27.

In the step ST27, the drive control portion 10 determines whether or not the front-rear direction position Pw of the seat 1 is in the upper limit area Au on the basis of the position detection signal from the seat position detection portion 9. In a case where the determination result is YES, the flow proceeds to the processing in a step ST28. In the step ST28, the drive control portion 10 controls the seating surface adjustment mechanism 4 so that the seat cushion 2 is moved to the seating surface position Pu. That is, in a case where the position of the seat cushion 2 in the up-down direction is positioned downward relative to the seating surface position Pu, the drive control portion 10 performs the drive-control to move the seat cushion 2 upwardly and to stop the seat cushion 2 at the seating surface position Pu. In a case where the position of the seat cushion 2 in the up-down direction is equal to the seating surface position Pu, the drive control portion 10 once stops the processing here without drive-controlling the seating surface adjustment mechanism 4. On the other hand, in a case where the determination result is NO in the step ST27, the flow proceeds to the processing in a step ST29.

In the step ST29, the drive control portion 10 determines whether or not the front-rear direction position Pw of the seat 1 is in the rear change area Abc on the basis of the position detection signal from the seat position detection portion 9. In a case where the determination result is YES, the flow proceeds to the processing in a step ST30. In the step ST30, the drive control portion 10 drive-controls the seating surface adjustment mechanism 4 so that the seat cushion 2 is moved to the seating surface position Pbc. That is, in a case where the position of the seat cushion 2 in the up-down direction is positioned downward relative to the seating surface position Pbc, the drive control portion 10 performs the drive-control to move the seat cushion 2 upwardly and to stop the seat cushion 2 at the seating surface position Pbc. In a case where the position of the seat cushion 2 in the up-down direction is positioned upward relative to the seating surface position Pbc, the drive control portion 10 performs the drive-control to move the seat cushion 2 downwardly and to stop the seat cushion 2 at the seating surface position Pbc. In a case where the position of the seat cushion 2 in the up-down direction is equal to the seating surface position Pbc, the drive control portion 10 once stops the processing here without drive-controlling the seating surface adjustment mechanism 4. On the other hand, in a case where the determination result is NO in the step ST29, the flow proceeds to the processing in a step ST31.

In the step ST31, the drive control portion 10 determines whether or not the front-rear direction position Pw of the seat 1 is in the rear area Ab on the basis of the position detection signal from the seat position detection portion 9. In a case where the determination result is YES, the flow proceeds to the processing in a step ST32. In the step ST32, the drive control portion 10 drive-controls the seating surface adjustment mechanism 4 so that the seat cushion 2 is moved to the seating surface position Pb. That is, in a case where the position of the seat cushion 2 in the up-down direction is positioned upward relative to the seating surface position Pb, the drive control portion 10 performs the drive-control to move the seat cushion 2 downwardly and to stop the seat cushion 2 at the seating surface position Pb. In a case where the position of the seat cushion 2 in the up-down direction is equal to the seating surface position Pb, the drive control portion 10 once stops the processing here without drive-controlling the seating surface adjustment mechanism 4. On the other hand, in a case where the determination result is NO in the step ST31, the drive control portion 10 once stops the processing here.

According to the embodiment described above, the following effects and advantages are attained.

(1) In a case where the intention of the occupant to get off the vehicle is detected by the vehicle egress intention detection portion 13, the seat cushion 2 of the seat 1 on which the occupant is seated is moved to be positioned at a height that corresponds to the position of the seat 1 in the vehicle front-rear direction. Because the position of the seat 1 in the front-rear direction is likely to be affected by the build of the occupant, it is possible when the occupant gets off the vehicle to bring the seat cushion 2 to the seating surface position that is most suitable for the build of the occupant by moving the seat cushion 2 to the height that corresponds to the position of the seat 1 in the vehicle front-rear direction. In addition, the drive control portion 10 only drive-controls the seating surface adjustment mechanism 4 so that the seat cushion 2 is moved to the seating surface position corresponding to the position of the seat 1 in the front-rear direction which is detected by the seat position detection portion 9, and thus a complicated process is not needed for obtaining the build of the occupant. Consequently, with the simple configuration as explained above, the build of the occupant may be determined and the ease of the occupants egress from the vehicle is ensured.

(2) In a case where the position of the seat 1 in the front-rear direction is positioned in the first set area A1, when the seat 1 is positioned at a first position in the vehicle front-rear direction, the seat cushion 2 of the seat 1 is moved to be equal to or higher compared to the seating surface position of the seat cushion 2 when the seat 1 is positioned at a second position that is positioned forward relative to the first position in the vehicle front-rear direction. Specifically, the position of the seat 1 in the front-rear direction is likely to be affected by the build of the occupant, and it is assumed that the more forward the position of the seat 1 in the front-rear direction is positioned, the smaller build the occupant has, and it is assumed that the more rearward the position of the seat 1 in the front-rear direction is positioned, the larger build the occupant has. That is, by moving the seat cushion 2 of the seat 1 to the seating surface position at which the occupant having the large build gets off the vehicle easily or to the seating surface position at which the occupant having the small build gets off the vehicle easily, the seating surface position that is most suitable for the build of the occupant during getting off the vehicle is obtained. This allows the occupant to get off the vehicle in a state where the seat cushion 2 has been moved to the position that is suitable for the build of the occupant, which enhances the ease of the occupant's egress from the vehicle.

(3) When the position of the seat 1 in the front-rear direction is in the front area Af, the drive control portion 10 drive-controls the seating surface adjustment mechanism 4 so that the seating surface position Pf that is identical to the seating surface position set to correspond to a foremost position of the seat 1 in the vehicle front-rear direction in the front change area Afc is maintained. Specifically, it is assumed that the more forward the seat 1 is positioned in the first set area A1, the smaller build the occupant has, and that the more rearward the seat 1 is positioned in the first set area A1, the larger build the occupant has. This is because it is likely to be assumed that the more forward the position of the seat 1 in the front-rear direction is positioned, the smaller build the occupant has, and that the more rearward the position of the seat 1 in the front-rear direction is positioned, the larger build the occupant has. In the first set area A1 of the seat 1, the front area Af is set to be forward relative to the front change area Afc. Accordingly, in a case where the position of the seat 1 in the front-rear direction is positioned in the front area Af, the seat cushion 2 is moved so that the seating surface position comes to be lower and the seating surface position Pf is maintained in the front area Af. Thus, the seating surface position Pf is set at the position where the feet of the occupant, whose build is assumed to be small, touch the ground in the sitting posture on the seat 1, and the feet and the legs of the occupant are restricted from touching and interfering with the vehicle during the movement of getting off the vehicle, and therefore the ease of the occupant's egress from the vehicle is enhanced. In addition, when the position of the seat 1 in the front-rear direction is in the upper limit area Au, the drive control portion 10 drive-controls the seating surface adjustment mechanism 4 so that the seating surface position Pu, which is identical to the surface position that is set to correspond to a rearmost position of the seat 1 in the vehicle front-rear direction in the front change area Afc, is maintained. In the first set area A1 of the seat 1, the upper limit area Au is set to be rearward relative to the front change area Afc. Accordingly, in a case where the position of the seat 1 in the front-rear direction is positioned in the upper limit area Au, the seat 1 is moved so that the seating surface position comes to be higher and the seating surface position is maintained at the seating surface position Pu in the upper limit area Au. Thus, the feet and the legs of the occupant are restricted from interfering with and being caught in the vehicle during the movement of getting off the vehicle, and it is restricted that occupant hits his or her head on the ceiling of the vehicle during the movement of getting off the vehicle, which may occur because the seat cushion 2 is positioned too high.

(4) When the position of the vehicle seat 1 in the front-rear direction is in the second set area A2 that is set to be rearward relative to the first set area A1, the drive control portion 10 drive-controls the seating surface adjustment mechanism 4 so that the seating surface position of the seat cushion 2 when the vehicle seat 1 is positioned at a third position in the vehicle front-rear direction is moved to be equal to or lower compared to the seating surface position of the seat cushion 2 when the vehicle seat 1 is positioned at a fourth position that is positioned forward relative to the third position in the vehicle front-rear direction. In the front-rear movable range Afb of the seat 1, the second set area A2 of the seat 1 is set to be rearward relative to the first set area A1. Accordingly, in a case where the position of the seat 1 in the front-rear direction is positioned in the second set area A2, it is assumed that the build of the occupant is larger than the build that is assumed in a case where the seat 1 is positioned in the first set are A1. Thus, the seat cushion 2 is moved so as to be positioned lower in order that the seating surface position corresponds to the build, which is assumed to be larger, and the seating surface position is maintained at the seating surface position Pb in the rear area Ab. Thus, the occupant may get off the vehicle in a state where the seat cushion 2 of the seat 1 has been moved to the position that restricts the occupant having the large build hits his or her head on the ceiling of the vehicle during the movement of getting off the vehicle, and therefore the ease of the occupant's egress from the vehicle is even more ensured.

(5) In a case where the drive control portion 10 identifies the user via the communication between the drive control portion 10 and the portable equipment 15 carried by the user, and detects the intention of the user to get in the vehicle, the drive control portion 10 drive-controls the seating surface adjustment mechanism 4 so that the seat cushion 2 is moved to the seating surface position that is set so as to correspond to the position of the seat 1 in the front-rear direction when the user drives the vehicle, which is stored in the memory portion 11. Accordingly, the user may get in the vehicle in a state where the seat cushion 2 of the seat 1 has been moved to the seating surface height that corresponds to the build of the user, and thus ease of the user's ingress to the vehicle is enhanced.

The aforementioned embodiment may be modified as follows.

According to the aforementioned embodiment, the drive control portion 10 dive-controls the seating surface adjustment mechanism 4 when the occupant gets off the vehicle, however, it is not limited thereto and the drive control portion 10 may drive-control the seating surface adjustment mechanism 4 and the seat position adjustment mechanism 5. For example, in a case where the drive control portion 10 receives the vehicle egress intention detection signal from the vehicle egress intention detection portion 13, the drive control portion 10 drive-controls the seat position adjustment mechanism 5, as well as performing the vehicle egress seating surface control on the seating surface adjustment mechanism 4. That is, the drive control portion 10 conducts a front rear movement control by drive-controlling the seat position adjustment mechanism 5 so that the seat 1 is moved rearward (for example, to the position corresponding to 50 mm) in addition to drive-controlling the seating surface adjustment mechanism 4. Due to this configuration, a vehicle cabin space between the seat 1 and a front portion of the vehicle becomes larger, and thus a space for the movement of the occupant at getting off the vehicle becomes larger, which enhances the ease of the occupant's egress from the vehicle.

According to the aforementioned embodiment, the drive control portion 10 dive-controls the seating surface adjustment mechanism 4 when the occupant, that is, the user, gets in the vehicle, however, it is not limited thereto and the drive control portion 10 may drive-control the seating surface adjustment mechanism 4 and the seat position adjustment mechanism 5. For example, in a case where the drive control portion 10 receives the vehicle ingress intention detection signal from the vehicle ingress intention detection portion 14, the drive control portion 10 drive-controls the seat position adjustment mechanism 5, as well as performing the vehicle ingress seating surface control on the seating surface adjustment mechanism 4. That is, the drive control portion 10 performs the front rear movement control by drive-controlling the seat position adjustment mechanism 5 so that the seat 1 is moved rearward (for example, to the position corresponding to 50 mm) in addition to drive-controlling the seating surface adjustment mechanism 4. Due to this configuration, the vehicle cabin space between the seat 1 and the front portion of the vehicle becomes larger, and thus the space for the movement of the occupant at getting in the vehicle becomes larger, which enhances the ease of the user's ingress to the vehicle.

According to the aforementioned embodiment, the seat position adjustment mechanism 5 is drive-controlled by the actuation of the front-rear driving actuator 7 on the basis of the control signal from the drive control portion 10. However, it is not limited thereto and the seat position adjustment mechanism 5 may be a mechanical-type which is operated to move in the front-rear direction by the occupant manually instead of electrically.

According to the aforementioned embodiment, the drive control portion 10 is provided at the seat 1, however, the drive control portion 10 may be provided, for example, at the interior floor of the vehicle other than the seat 1.

The numerical values referred to in the aforementioned embodiment may be changed to other numerical values as far as the ease of the user's egress from and/or ingress to the vehicle is ensured. For example, the seating surface position Pu set in the upper limit area Au is set at 50 mm in the aforementioned embodiment, however, the seating surface position Pu may be set at, for example, 55 mm as far as the ease of the user's egress from and/or ingress to the vehicle is assured without, for example, hitting his or her head on the ceiling of the vehicle. Further, each of the seating surface position Pf and the seating surface position Pu which are set in the front area Af and the rear area Ab, respectively is set at 5 mm in the aforementioned embodiment, however, each of the seating surface position Pf and the seating surface position Pu may be set at other value including, for example, 15 mm as far as the ease of the user's egress from the vehicle is assured. Further, the seating surface position Pf and the seating surface position Pb in the front area Af and the rear area Ab are set at the identical value in the aforementioned embodiment, however, the seating surface position Pf and the seating surface position Pb may be set at different values from each other. Further, the seating surface position Pfc is set so as to rise in proportion to the position of the seat 1 in the front-rear direction in the front change area Afc, and the seating surface position Pbc is set so as to lower in inversely proportional to the position of the seat 1 in the front-rear direction in the rear change area Abc in the aforementioned embodiment, however, the seating surface position Pfc, Pbc may be set so as to rise or so as to be lowered while presenting a stepwise shape or a curve of the second order relative to the position of the seat 1 in the front-rear direction in the front change area Afc and the rear change area Abc in the transition diagram in FIG. 2.

According to the aforementioned embodiment, the seat apparatus for the vehicle includes the seating surface adjustment mechanism 4 provided with the up-down driving actuator 6 and moving the seat cushion 2 of the seat 1 in the up-down direction by means of the actuation of the up-down driving actuator 6, the seat position adjustment mechanism 5 for moving the seat 1 in the vehicle front-rear direction, the seat position detection portion 9 for detecting the front-rear direction position Pw of the seat 1, the vehicle egress intention detection portion 13 for detecting the intention of the occupant of the vehicle to get off the vehicle, and the drive control portion 10 for performing the vehicle egress seating surface control in a case where the vehicle egress intention detection portion 13 detects the intention of the occupant to get off the vehicle, the vehicle egress seating surface control controlling the seating surface adjustment mechanism 4 so that the seat cushion 2 of the seat 1 is positioned at the seating surface position Pf, Pfc, Pu, Pbc, Pb that is set to correspond to the front-rear direction position Pw of the seat 1 which is detected at the seat position detection portion 9.

According to the above described configuration, in a case where the intention of the occupant to get off the vehicle is detected by the vehicle egress intention detection portion 13, the seat cushion 2 of the seat 1 on which the occupant is seated is moved to be positioned at the height that corresponds to the position of the seat 1 in the vehicle front-rear direction. Because the position of the seat 1 in the front-rear direction is likely to be affected by the build of the occupant, it is possible, when the occupant gets off the vehicle, to bring the seat cushion 2 to the seating surface position that is most suitable for the build of the occupant by moving the seat cushion 2 to the height that corresponds to the position of the seat 1 in the vehicle front-rear direction. In addition, the drive control portion 10 only drive-controls the seating surface adjustment mechanism 4 so that the seat cushion 2 is moved to the seating surface position corresponding to the position of the seat 1 in the front-rear direction which is detected by the seat position detection portion 9, and thus the complicated process is not needed for obtaining the build of the occupant. Consequently, with the simple configuration as explained above, the build of the occupant may be determined and the ease of the occupant's egress from the vehicle is ensured.

Consequently, the build of the occupant is determined and the ease of the occupant's egress from the vehicle is ensured with the simple configuration.

According to the aforementioned embodiment, the drive control portion 10 performs the vehicle egress seating surface control wherein the seating surface adjustment mechanism 4 is drive-controlled so that the seating surface position Pf, Pfc, Pu of the seat cushion 2 of the seat 1 when the seat 1 is positioned at the first position in the vehicle front-rear direction is equal to or higher compared to the seating surface position Pf, Pfc, Pu of the seat cushion 2 when the seat 1 is positioned at the second position that is positioned forward relative to the first position in the vehicle front-rear direction in a case where the seat 1 is in the first set area A1 that is predetermined in the front-rear movable range Afb of the seat 1.

According to the above described configuration, when the drive control portion 10 performs the vehicle egress seating surface control, in a case where the seat 1 is in the first set area A1 that is predetermined in the front-rear movable range Afb of the seat 1, the drive control portion 10 drive-controls the seating surface adjustment mechanism 4 so that the seating surface position Pf, Pfc, Pu of the seat cushion 2 of the seat 1 when the seat 1 is positioned at the first position in the vehicle front-rear direction is equal to or higher compared to the seating surface position Pf, Pfc, Pu of the seat cushion 2 when the seat 1 is positioned at the second position that is positioned forward relative to the first position in the vehicle front-rear direction. Specifically, the position of the seat 1 in the front-rear direction is likely to be affected by the build of the occupant seated on the seat 1, and it is assumed that the more forward the position of the seat 1 in the front-rear direction is, the smaller build the occupant has, and it is assumed that the more rearward the position of the seat 1 in the front-rear direction is, the larger build the occupant has. That is, the seating surface position that is most suitable for the build of the occupant during getting off the vehicle is obtained by moving the seat cushion 2 of the seat 1 to the seating surface position where the occupant of the large build may get off the vehicle with ease or to the seating surface position where the occupant of the small build may get off the vehicle with ease. This allows the occupant to get off the vehicle in a state where the seat cushion 2 is moved to the position that is suitable for the build of the occupant, which enhances the ease of the occupant's egress from the vehicle.

According to the aforementioned embodiment, the first set area A1 is subdivided into the front area Af, the front change area Afc that is set to be rearward in the vehicle front-rear direction relative to the front area Af and the upper limit area Au that is set to be rearward relative to the front change area Afc, and the drive control portion 10 performs the vehicle egress seating surface control wherein the seating surface adjustment mechanism 4 is controlled so that the surface position which is set to correspond to the foremost position of the seat 1 in the vehicle front-rear direction in the front change area Afc is maintained in a case where the seat 1 is positioned in the front area Af and the seating surface adjustment mechanism 4 is controlled so that the seating surface position which is set to correspond to the rearmost position of the seat 1 in the vehicle front-rear direction in the front change area Afc is maintained in a case where the seat 1 is positioned in the upper limit area Au.

According to the above described configuration, when the position of the seat 1 in the front-rear direction is in the front area Af, the drive control portion 10 drive-controls the seating surface adjustment mechanism 4 so that the seating surface position N that is identical to the surface position set to correspond to the foremost position of the seat 1 in the vehicle front-rear direction in the front change area Afc is maintained. In the first set area A1 of the seat 1, the front area Af is set to be forward relative to the front change area Afc. Accordingly, in a case where the position of the seat 1 in the front-rear direction is positioned in the front area Af, the seat 1 is moved so that the seating surface position comes to be lower and the seating surface position Pf is maintained in the front area Af. Thus, the seating surface position Pf is set at the position where the feet and the legs of the occupant, whose build is assumed to be small, are restricted from interfering with and being caught in the vehicle during the movement of getting off the vehicle, and therefore the ease of the occupant's egress from the vehicle is enhanced. In addition, when the position of the seat 1 in the front-rear direction is in the upper limit area Au, the drive control portion 10 drive-controls the seating surface adjustment mechanism 4 so that the seating surface position Pu that is identical to the surface position set to correspond to the rearmost position of the seat 1 in the vehicle front-rear direction in the front change area Afc is maintained. In the first set area A1 of the seat 1, the upper limit area Au is set to be rearward relative to the front change area Afc. Accordingly, in a case where the position of the seat 1 in the front-rear direction is positioned in the upper limit area Au, the seat 1 is moved so that the seating surface position comes to be higher and the seating surface position is maintained in the upper limit area Au. This restricts that the occupant hits his or her head on the ceiling of the vehicle during the movement of getting off the vehicle because the seating surface that is positioned too high.

According to the aforementioned embodiment, the drive control portion 10 performs the vehicle egress seating surface control wherein the seating surface adjustment mechanism 4 is drive-controlled so that the seating surface position Pbc, Pb of the seat cushion 2 of the seat 1 when the seat 1 is positioned at the third position in the vehicle front-rear direction is equal to or lower compared to the seating surface position Pbc, Pb of the seat cushion 2 when the seat 1 is positioned at the fourth position that is positioned forward relative to the third position in the vehicle front-rear direction in a case where the seat 1 is in the second set area A2 that is set to be rearward relative to the first set area A1.

According to the above described configuration, in a case where the seat 1 is in the second set area A2 that is set to be rearward relative to the first set area A1, the drive control portion 10 drive-controls the seating surface adjustment mechanism 4 so that the seating surface position Pbc, Pb of the seat cushion 2 of the seat 1 when the seat 1 is positioned at the third position in the vehicle front-rear direction is equal to or lower compared to the seating surface position Pbc, Pb of the seat cushion 2 when the seat 1 is positioned at the fourth position that is positioned forward relative to the third position in the vehicle front-rear direction. That is, in the front-rear movable range Afb, when the position of the seat 1 in the front-rear direction is positioned in the second set area A2, the build of the occupant is assumed to be larger than the build that is assumed to be when the seat 1 is positioned in the first set area A1. Thus, the seat 1 is moved so that the seating surface position is lowered corresponding to the build, which is assumed to be large, the seating surface position is maintained in the rear area Ab. Thus, the occupant may get off the vehicle in a state where the seat cushion 2 of the seat 1 is moved to the position that restricts the occupant having the large build hits his or her head on the ceiling of the vehicle during the movement of getting off the vehicle, and therefore the ease of the occupant's egress from the vehicle is even more ensured.

According to the aforementioned embodiment, the seat position adjustment mechanism 5 includes the front-rear driving actuator 7 for moving the seat 1 in the vehicle front-rear direction, and the drive control portion 10 performs the front rear movement control for controlling the seat position adjustment mechanism 5 to move the seat 1 rearward in the vehicle front-rear direction when the drive control portion 10 performs the vehicle egress seating surface control.

According to the above described configuration, when the drive control portion 10 performs the vehicle egress seating surface control, the drive control portion 10 performs the front rear movement control for moving the seat 1 rearward in the vehicle front-rear direction in addition to performing the vehicle egress seating surface control. Thus, the vehicle cabin space between the seat 1 and the front portion of the vehicle becomes larger, and thus the space for the movement of the occupant at getting off the vehicle becomes larger, which enhances the ease of the occupant's egress from the vehicle.

According to the aforementioned embodiment, the seat apparatus further includes the vehicle ingress intention detection portion 14 for detecting the intention of the vehicle user to get on the seat cushion 2 of the seat 1, the user identification portion 12 for identifying the vehicle user on the basis of the communication between the user identification portion 12 and the portable equipment 15 carried by the vehicle user and transmitting the identification signal that is unique to the vehicle user, and the memory portion 11 storing the front-rear direction position Pw of the seat 1 when the vehicle user drives the vehicle, wherein the drive control portion 10 identifies the vehicle user by means of the user identification portion 12, and the drive control portion 10 performs the vehicle ingress seating surface control in a case where the vehicle ingress intention detection portion 14 detects the intention of the vehicle user to get on the seat cushion 2 of the seat 1, the vehicle ingress seating surface control drive-controls the seating surface adjustment mechanism 4 so that the seat cushion 2 of the seat 1 is positioned at the seating surface position Pf, Pfc, Pu, Pbc, Pb that is set to correspond to the front-rear direction position Pw of the seat 1 which is stored at the memory portion 11.

According to the above described configuration, in a case where the drive control portion 10 identifies the vehicle user via the communication between the drive control portion 10 and the portable equipment 15 carried by the vehicle user, and detects the intention of the vehicle user to get in the vehicle, the drive control portion 10 drive-controls the seating surface adjustment mechanism 4 so that the seat cushion 2 is moved to the seating surface position that is set so as to correspond to the position of the seat 1 in the front-rear direction when the vehicle user drives the vehicle, which is stored in the memory portion 11. Accordingly, the vehicle user may get in the vehicle in a state where the seat cushion 2 of the seat 1 is moved to the height that corresponds to the build of the vehicle user, and thus the ease of the user's ingress to the vehicle is enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A seat apparatus for a vehicle, comprising:
a seating surface adjustment mechanism provided with an actuator and moving a seating surface of a vehicle seat in an up-down direction by means of an actuation of the actuator;
a seat position adjustment mechanism for moving the vehicle seat in a vehicle front-rear direction;
a seat position detection portion for detecting a front-rear direction position of the vehicle seat;
a vehicle egress intention detection portion for detecting an intention of an occupant of the vehicle to get off the vehicle; and
a drive control portion for performing a vehicle egress seating surface control in a case where the vehicle egress intention detection portion detects the intention of the occupant to get off the vehicle, the vehicle egress seating surface control controlling the seating surface adjustment mechanism so that the seating surface of the vehicle seat is positioned at a seating surface position that is set to correspond to the front-rear direction position of the vehicle seat which is detected at the seat position detection portion,
wherein the drive control portion performs the vehicle egress seating surface control and the seating surface adjustment mechanism is drive-controlled so that the seating surface position of the seating surface of the vehicle seat when the vehicle seat is positioned at a first position in the vehicle front-rear direction is higher compared to the seating surface position of the seating surface when the vehicle seat is positioned at a second position that is positioned forward relative to the first position in the vehicle front-rear direction in a case where the vehicle seat is in a first set area that is predetermined in a front-rear movable range of the vehicle seat, and wherein the drive control portion performs the vehicle egress seating surface control and the seating surface adjustment mechanism is drive-controlled so that the seating surface position of the seating surface of the vehicle seat when the vehicle seat is positioned at a third position in the vehicle front-rear direction is lower compared to the seating surface position of the seating surface when the vehicle seat is positioned at a fourth position that is positioned forward relative to the third position in the vehicle front-rear direction in a case where the vehicle seat is in a second set area that is set to be rearward relative to the first set area.

2. The seat apparatus according to claim 1, wherein the first set area is subdivided into a front area, a front change area that is set to be rearward in the vehicle front-rear direction relative to the front area and an upper limit area that is set to be rearward relative to the front change area, and the drive control portion performs the vehicle egress seating surface control wherein the seating surface adjustment mechanism is controlled so that the surface position which is set to correspond to a foremost position of the vehicle seat in the vehicle front-rear direction in the front change area is maintained in a case where the vehicle seat is positioned in the front area and the seating surface adjustment mechanism is controlled so that the seating surface position which is set to correspond to a rearmost position of the vehicle seat in the vehicle front-rear direction in the front change area is maintained in a case where the vehicle seat is positioned in the upper limit area.

3. The seat apparatus according to claim 1, wherein the seat position adjustment mechanism includes a front-rear driving actuator for moving the vehicle seat in the vehicle front-rear direction, and the drive control portion performs a front rear movement control for controlling the seat position adjustment mechanism to move the vehicle seat rearward in the vehicle front-rear direction when the drive control portion performs the vehicle egress seating surface control.

4. The seat apparatus according to claim 1, further comprising:

a vehicle ingress intention detection portion for detecting an intention of a vehicle user to get on the seating surface of the vehicle seat;

a user identification portion for identifying the vehicle user on the basis of a communication between the user identification portion and a portable equipment carried by the vehicle user and transmitting an identification signal that is unique to the vehicle user; and a memory portion storing the front-rear direction position of the vehicle seat when the vehicle user drives the vehicle, wherein the drive control portion identifies the vehicle user by means of the user identification portion, and the drive control portion performs a vehicle ingress seating surface control in a case where the vehicle ingress intention detection portion detects the intention of the vehicle user to get on the seating surface of the vehicle seat, the vehicle ingress seating surface control drive-controls the seating surface adjustment mechanism so that the seating surface of the vehicle seat is positioned at the seating surface position that is set to correspond to the front-rear direction position of the vehicle seat which is stored at the memory portion.

* * * * *